(12) United States Patent
Svendsen

(10) Patent No.: US 7,734,589 B1
(45) Date of Patent: Jun. 8, 2010

(54) SYSTEM AND METHOD FOR OPTIMIZING DATA UPLOADING IN A NETWORK BASED MEDIA SHARING SYSTEM

(75) Inventor: Hugh Svendsen, Chapel Hill, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 692 days.

(21) Appl. No.: 11/228,056

(22) Filed: Sep. 16, 2005

(51) Int. Cl.
*G06F 7/00* (2006.01)

(52) U.S. Cl. ............................. 707/636; 707/694

(58) Field of Classification Search ............... None
See application file for complete search history.

(56) References Cited

U.S. PATENT DOCUMENTS

| | | | |
|---|---|---|---|
| 5,760,917 A | 6/1998 | Sheridan | 358/442 |
| 6,016,478 A * | 1/2000 | Zhang et al. | 705/9 |
| 6,301,586 B1 | 10/2001 | Yang et al. | 707/104 |
| 6,314,408 B1 | 11/2001 | Salas et al. | 705/54 |
| 6,574,629 B1 | 6/2003 | Cooke, Jr. et al. | 707/10 |
| 6,578,072 B2 | 6/2003 | Watanabe et al. | 709/217 |
| 6,583,799 B1 * | 6/2003 | Manolis et al. | 715/838 |
| 6,629,100 B2 | 9/2003 | Morris et al. | 707/10 |
| 6,629,104 B1 | 9/2003 | Parulski et al. | 707/102 |
| 6,636,259 B1 | 10/2003 | Anderson et al. | 348/211.3 |
| 6,671,424 B1 | 12/2003 | Skoll et al. | 382/305 |
| 6,675,205 B2 | 1/2004 | Meadway | |
| 6,757,684 B2 * | 6/2004 | Svendsen et al. | 707/10 |
| 6,804,684 B2 | 10/2004 | Stubler et al. | 707/104.1 |
| 6,857,053 B2 | 2/2005 | Bolik et al. | |
| 6,871,231 B2 * | 3/2005 | Morris | 709/225 |
| 6,904,160 B2 | 6/2005 | Burgess | 382/113 |
| 6,947,959 B1 * | 9/2005 | Gill | 715/501.1 |
| 6,976,028 B2 * | 12/2005 | Fenton et al. | 707/102 |
| 6,976,090 B2 * | 12/2005 | Ben-Shaul et al. | 709/246 |
| 7,117,453 B2 * | 10/2006 | Drucker et al. | 715/833 |
| 7,263,562 B2 * | 8/2007 | DeVorchik et al. | 709/246 |
| 2002/0087546 A1 | 7/2002 | Slater et al. | 707/10 |
| 2002/0188602 A1 | 12/2002 | Stubler et al. | 707/3 |
| 2002/0194195 A1 | 12/2002 | Fenton et al. | |
| 2003/0018802 A1 | 1/2003 | Romanik et al. | |
| 2003/0052897 A1 | 3/2003 | Lin | |
| 2003/0074373 A1 | 4/2003 | Kaburagi et al. | 707/104.1 |
| 2003/0110126 A1 | 6/2003 | Dunkeld et al. | |
| 2003/0131002 A1 | 7/2003 | Gennetten et al. | 707/10 |
| 2003/0172297 A1 * | 9/2003 | Gunter | 713/201 |
| 2004/0024739 A1 | 2/2004 | Copperman et al. | |

(Continued)

*Primary Examiner*—Pierre M Vital
*Assistant Examiner*—Augustine Obisesan
(74) *Attorney, Agent, or Firm*—Withrow & Terranova, PLLC

(57) ABSTRACT

A system and method for optimizing the uploading of digital assets from a client node to a central node in a digital asset sharing system are provided. Digital assets residing at a client node are each tagged with one or more keywords. The client node sends a list of the keywords used to tag the digital assets to the central node and requests that invitations including the list of keywords be sent to potential guests. The potential guests select one or more of the keywords and send responses to the central node identifying the selected keywords. The central node processes the responses to generate a list of desired keywords and requests the digital images tagged with one or more keywords from the list of desired keywords from the client node. In response, the client node uploads the requested digital assets to the central node where they are stored.

31 Claims, 7 Drawing Sheets

U.S. PATENT DOCUMENTS

| | | | |
|---|---|---|---|
| 2004/0103203 A1* | 5/2004 | Nichols et al. | 709/229 |
| 2004/0111415 A1 | 6/2004 | Scardino et al. | 707/10 |
| 2004/0139172 A1* | 7/2004 | Svendsen et al. | 709/219 |
| 2004/0145660 A1 | 7/2004 | Kusaka | |
| 2004/0172451 A1 | 9/2004 | Biggs et al. | 709/206 |
| 2004/0201692 A1 | 10/2004 | Parulski et al. | 348/207.1 |
| 2004/0230663 A1 | 11/2004 | Ackerman | 709/207 |
| 2004/0260679 A1* | 12/2004 | Best et al. | 707/3 |
| 2005/0015389 A1* | 1/2005 | Novak et al. | 707/100 |
| 2005/0044483 A1 | 2/2005 | Maze et al. | 715/501.1 |
| 2005/0052685 A1* | 3/2005 | Herf et al. | 358/1.15 |
| 2005/0060299 A1 | 3/2005 | Filley et al. | 707/3 |
| 2005/0060356 A1 | 3/2005 | Saika | |
| 2005/0091289 A1* | 4/2005 | Shappell et al. | 707/201 |
| 2005/0097173 A1 | 5/2005 | Johns et al. | 709/206 |
| 2005/0131871 A1* | 6/2005 | Howard et al. | 707/3 |
| 2005/0273476 A1 | 12/2005 | Wertheimer et al. | |
| 2006/0085490 A1 | 4/2006 | Baron et al. | |
| 2006/0224943 A1 | 10/2006 | Snyder et al. | |
| 2006/0253434 A1* | 11/2006 | Beriker et al. | 707/3 |
| 2007/0016575 A1 | 1/2007 | Hurst-Hiller et al. | |
| 2007/0067271 A1 | 3/2007 | Lu | |
| 2007/0067780 A1 | 3/2007 | Kumar et al. | |
| 2007/0073694 A1 | 3/2007 | Picault et al. | |
| 2007/0168463 A1* | 7/2007 | Rothschild | 709/217 |

* cited by examiner

Hugh Svendsen (shutterbug.quriophotos.com) has invited you to view his image collection. To ensure that the pictures that interest you are always available, please indicate the image categories that interest you the most.

- 62A ☐ Work
- 62B ☐ Family
- 62C ☒ Kids Sporting Events
- 62D ☐ Vacation
- 62E ☐ Wild Parties
- 62F ☐ Friends
- 62G ☒ Camera Phone

} 58

○ Match All Categories     ● Match Any Category

FIG. 5 shutterbug.quriophotos.com

— 64

Kids Sporting Events (456 Images - 643MB)
Camera Phone (28 Images - 27MB)

SYSTEM AND METHOD FOR OPTIMIZING DATA UPLOADING IN A NETWORK BASED MEDIA SHARING SYSTEM

FIELD OF THE INVENTION

The present invention relates to a network based media sharing system and more particularly relates to optimizing data uploading to a central node in the media sharing system.

BACKGROUND OF THE INVENTION

With the proliferation of digital cameras, numerous online photosharing services have emerged and are becoming widely accepted by photo enthusiasts. The photosharing services are generally based on one of two architectures. The first is a centrally hosted architecture where a central server hosts digital images for a number of users and provides photosharing services by serving the digital images to a web browser of a user or guest. The second is a peer-to-peer (P2P) architecture, such as that used by QURIO® photosharing software, where a user creates and stores photo albums on the user's computer. The user's computer then operates as a web server to provide the photo albums to the web browser of another user or guest.

One issue with the centrally hosted architecture is that the owner of the digital images must predict which images will be of interest to guests. More specifically, the owner has a limited amount of storage space on the central server. Since the owner will typically have more digital images than may be stored on the central server, the owner must predict which of his or her digital images will be of interest to the guests and upload only these images to the central server. As a result, the images in which the guests are actually interested may or may not be stored in the central server.

One issue with the peer-to-peer architecture is that the digital images at a peer node may only be available when the peer node is online. One system for addressing this issue is a hybrid peer-to-peer architecture that uses a proxy server to route traffic between a requesting node and a peer node. In order to make the digital images residing at the peer node available even when the peer node is offline, the proxy server may cache the digital images after serving a first request for the digital images. Thus, for subsequent requests, the digital images may be served directly from the proxy and are available even if the peer node is offline.

However, one issue with the hybrid peer-to-peer architecture having a caching proxy server is that there may be a time lag between the time at which the owner sends an invitation inviting a guest to view the digital images and the time at which the guest requests the digital images. During this time, the peer node may go offline. If the guest requests the digital images while the peer node is offline and before the digital images are cached by the proxy server, the digital images will not be available to the guest until the peer node is again online.

Thus, there remains a need for a system and method of uploading digital assets to a central node in either a centrally hosted system or a P2P system that does not require an owner of digital assets to predict which digital assets will be of interest to potential guests and improves the availability of digital assets in P2P system when a peer node hosting the digital assets is offline.

SUMMARY OF THE INVENTION

The present invention provides a system and method for optimizing the uploading of digital assets, such as digital images, from a client node to a central node in a digital asset sharing system based on keywords. In general, the system includes a central node and a client node. The digital assets reside at the client node and are each tagged with one or more keywords. The client node sends a list of the keywords used to tag the digital assets to the central node and requests that invitations to view the digital assets be sent to potential guests. The central node then sends invitations including the list of keywords to each of the potential guests, and the potential guests select one or more of the keywords in which they are interested. Responses identifying the keywords selected by the potential guests are sent to the central node. The central node processes the responses to generate a list of desired keywords and sends a request to the client node for the digital images tagged with one or more keywords from the list of desired keywords. In response, the client node uploads the digital assets tagged with one or more keywords from the list of desired keywords to the central node where the digital assets are stored.

For each of the potential guests, the central node sends a notification to the potential guest when the digital assets tagged by the keywords selected by the potential guest have been uploaded to the central node and stored. In one embodiment, the notification includes a web hyperlink for each keyword. When the potential guest clicks on the web hyperlink for a keyword, a Hypertext Transfer Protocol (HTTP) request for the digital assets tagged with the keyword is sent to the central node. In response, the central node retrieves the digital assets tagged with the keyword from storage and sends the retrieved digital assets to the potential guest.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 5 illustrates an exemplary e-mail invitation sent to a potential guest according to one embodiment of the present invention;

FIG. 6 illustrates an exemplary e-mail notification sent to a potential guest according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a system and method for optimizing the uploading of digital assets, such as digital images, from a client node to a central node in a digital asset sharing system based on keywords. While the description below focuses on an exemplary hybrid peer-to-peer (P2P) system 10 illustrated in FIG. 1, it is to be understood that the present invention is equally applicable to a centrally hosted sharing system.

Figure 1:
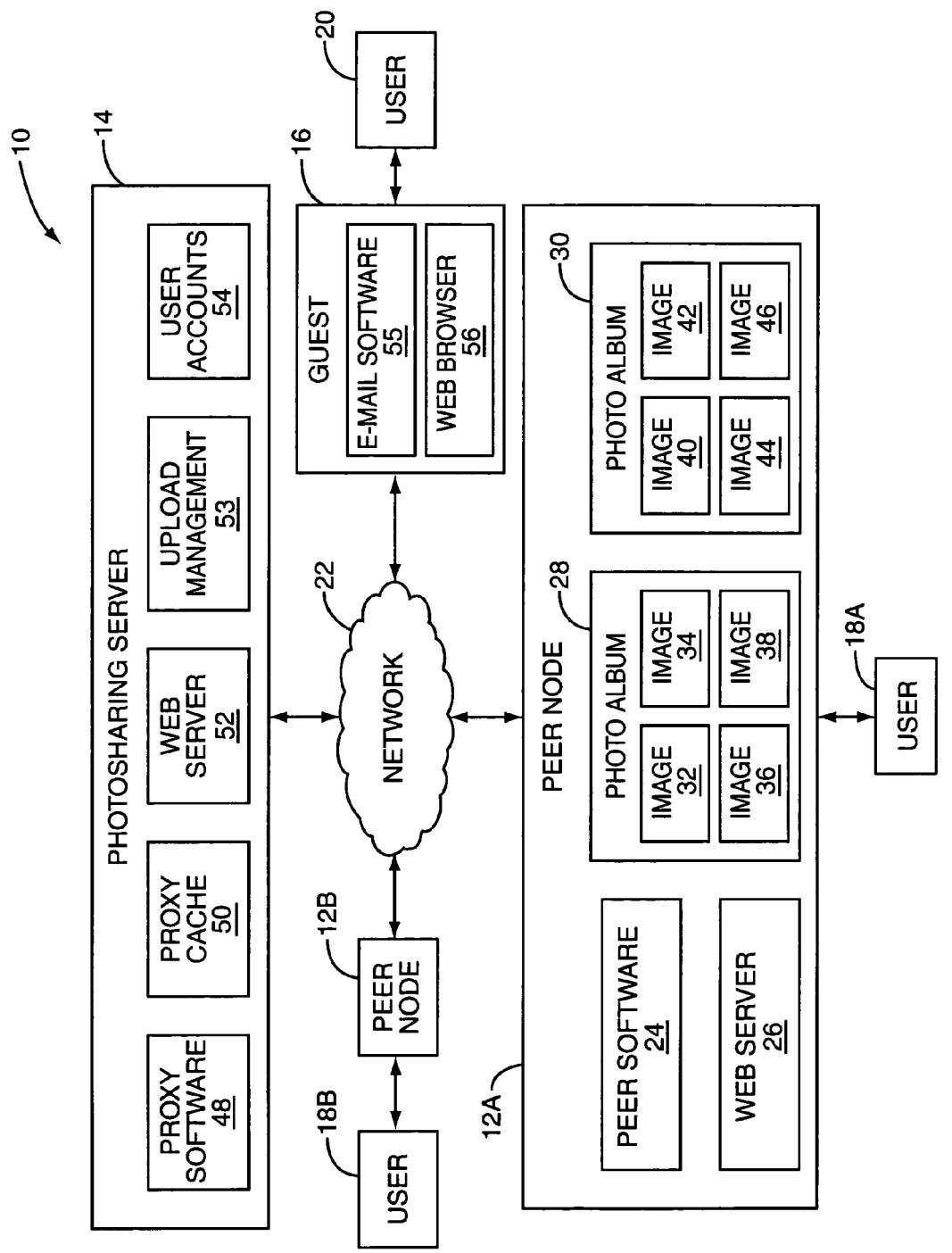
FIG. 1 illustrates an exemplary digital asset sharing system according to one embodiment of the present invention.

As illustrated in FIG. 1, the hybrid P2P system 10 includes peer nodes 12A and 12B, a photosharing server 14, guest node 16, users 18A and 18B, user 20 associated with the guest node 16, and network 22. Preferably, the network 22 is the Internet. There may be any number of peer nodes 12A, 12B and guest nodes 16. The peer nodes 12A and 12B may also be referred to as client nodes. However, as used herein, client node is not limited to the hybrid P2P system 10, but is also meant to include a client node associated with a digital asset owner in a centrally hosted sharing system. In a similar fashion, the photosharing server 14 may also be referred herein as a central node. However, as used herein, central node is not limited to the hybrid P2P system 10, but is also meant to include a central server in a centrally hosted sharing system.

In general, the peer nodes 12A and 12B are personal computers, mobile terminals, Personal Digital Assistants, or the like having access to the network 22. As illustrated, the peer node 12A includes peer software 24, a web server 26, and photo albums 28 and 30. It should be noted that the discussion herein of the peer node 12A is equally applicable to the peer node 12B. The web server 26 may be implemented in software. The photo album 28 includes digital images 32-38, and the photo album 30 includes digital images 40-46. Only two photo albums 28 and 30 are illustrated each having only four digital images 32-38 and 40-46, respectively. However, this is merely exemplary. The peer node 12A may include any number of photo albums, and the photo albums may include any number of digital images. Further, each of the digital images 32-38 and 40-46 may be included within any number of photo albums 28, 30. For example, the digital image 32 may be included within both of the photo albums 28 and 30. Also, the present invention is not limited to digital images. Any type of digital asset such as, but not limited to, images, video, audio, and the like may be shared according to the present invention.

The photosharing server 14, which may also be referred to as a digital asset sharing server or a central node, includes proxy software 48, proxy cache 50, a web server 52, upload management software 53, and user accounts 54. The web server 52 may be implemented in software. As described below in detail, the upload management software 53 operates to upload digital assets based on desired keywords selected by a number of potential guests. The user accounts 54 include information regarding account registration, user preferences, commerce information, potential guest lists, and the like.

The guest node 16 is a personal computer, mobile terminal, Personal Digital Assistant, or the like having access to the network 22 and preferably includes e-mail software 55 and a web browser 56. However, the e-mail software 55 is optional in that the web browser 56 may be used to access e-mail websites such as Yahoo!® Mail and the like.

In general, the present invention optimizes uploading of the digital images 32-46 from the peer node 12A to the photosharing server 14 based on keywords. More specifically, the user 18A interacts with the peer software 24 to define keywords. For example, the keywords may include "work," "family," "kids," "vacation," "parties," "friends," "camera phone," and the like. The peer software 24 may then publish, or send, the keywords to the photosharing server 14, where the photosharing server 14 stores the keywords in association with the peer node 12A. The user 18A then interacts with the peer software 24 to tag each of the digital images 32-46 with one or more keywords on either a per image basis or a per album basis, as discussed below in more detail.

Thereafter, the user 18A further interacts with the peer software 24 to invite one or more potential guests to view the digital images 32-46. The peer software 24 then sends a list of the potential guests including the e-mail addresses of the potential guests to the photosharing server 14. The list of potential guests may be stored within the user accounts 54. It should be noted that the peer node 12A may communicate with the photosharing server 14 over the network 22 using a pre-established socket connection as described in commonly owned and assigned U.S. patent application Ser. No. 10/813,839, entitled METHOD AND SYSTEM FOR PROVIDING WEB BROWSING THROUGH A FIREWALL IN A PEER TO PEER NETWORK, filed on Mar. 31, 2004, currently pending, which is hereby incorporated by reference in its entirety.

The photosharing server 14, and more specifically the upload management software 53, then sends invitations including a list of the keywords used to tag the digital images 32-46 to the potential guests via e-mail. The potential guests may be associated with another peer node such as the peer node 12B or a guest node such as the guest node 16. Upon receiving the invitation, each of the potential guests select one or more of the keywords in which the potential guest is interested, and a response is provided to the photosharing server 14. The response identifies the selected keywords and the potential guest.

The upload management software 53 processes the responses from the potential guests to generate a list of desired keywords including the keywords selected by at least one of the potential guests. The list of keywords may be prioritized based on keyword statistics such as the number of potential guests that selected each keyword and past viewing statistics for each keyword. For example, the keyword selected by ten potential guests may be given a higher priority than a keyword selected by five potential guests. As another example, keywords associated with images viewed frequently in the past may be assigned a higher priority than keywords associated with images viewed less frequently in the past. The list of keywords may alternatively or additionally be prioritized based on priorities given to each of the potential guests by the user 18A, which may also be referred to as the asset owner, and priorities assigned to the potential guests based on their past viewing statistics. For example, the keywords selected by a potential guest who has been assigned a high priority either by the user 18A or by the photosharing server 14 based on past viewing statistics may be given a high priority.

The upload management software 53 then sends a request to the peer node 12A for only the ones of the digital images 32-46 tagged with one or more of the keywords in the list of desired keywords. In other words, the upload management software 53 request the ones of the digital images 32-46 tagged with one or more of the keywords selected by the potential guests. In response, the peer node 12A uploads the ones of the digital images 32-46 tagged with the selected keywords to the photosharing server 14, and the photosharing server 14 stores the uploaded digital images in the proxy cache 50. As the digital images tagged with the selected keywords are uploaded and stored in the proxy cache 50, the upload management software 53 sends notifications to the potential guests indicating that the images are available for viewing.

Figure 2:
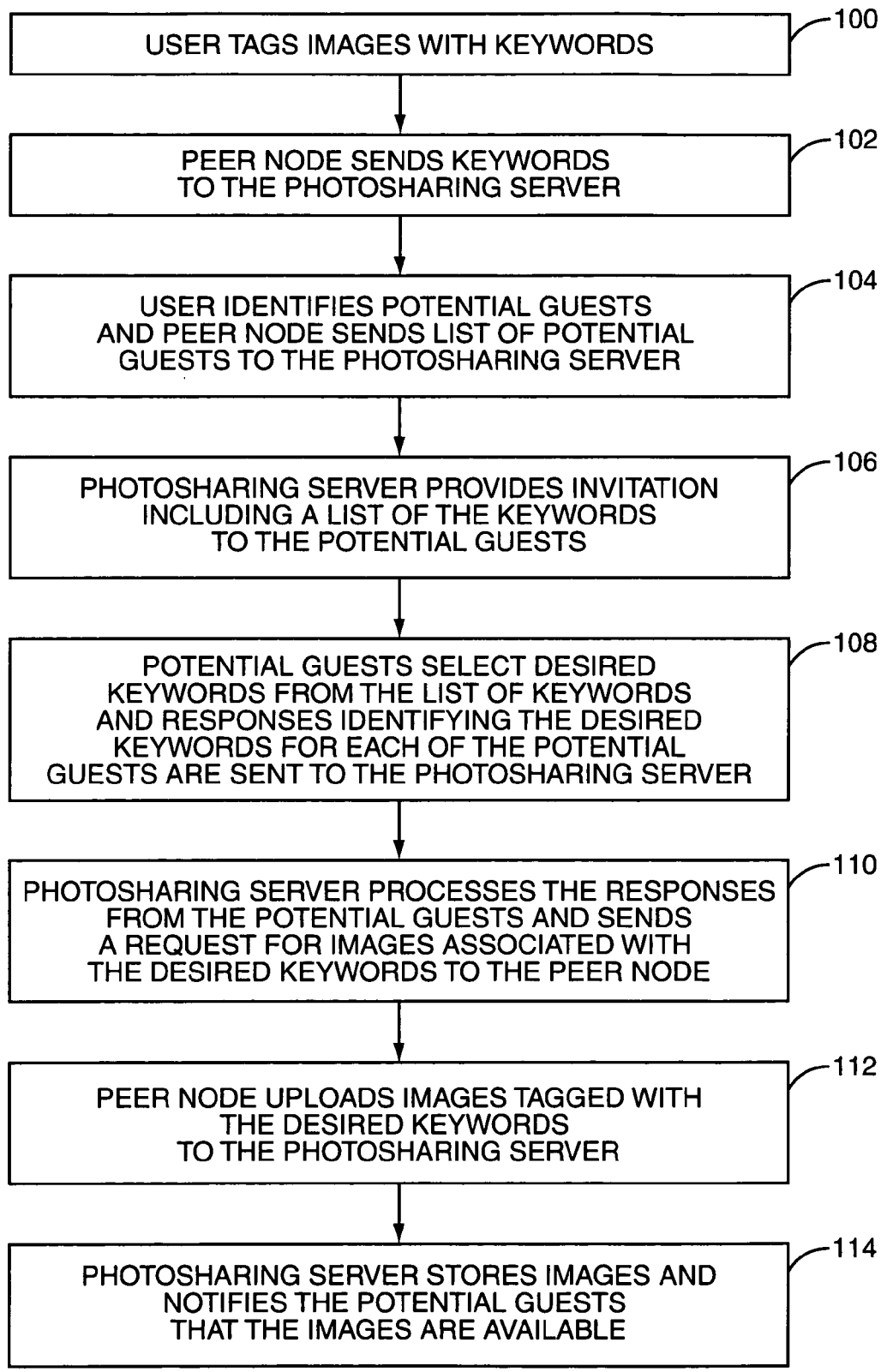
FIG. 2 is a basic flow chart illustrating the operation of the system of FIG. 1 according to one embodiment of the present invention.

FIG. 2 is a basic flow chart illustrating the operation of the hybrid P2P system 10 of FIG. 1 according to one embodiment of the present invention. Again, note that the following discussion is equally applicable to a centrally hosted sharing system. First, the user 18A interacts with the peer node 12A to tag each of the digital images 32-46 with one or more keywords (step 100). Prior to tagging the digital images 32-46 with keywords, the user 18A may define a list of keywords including the keywords to be used to tag the digital images 32-46.

Figure 3:
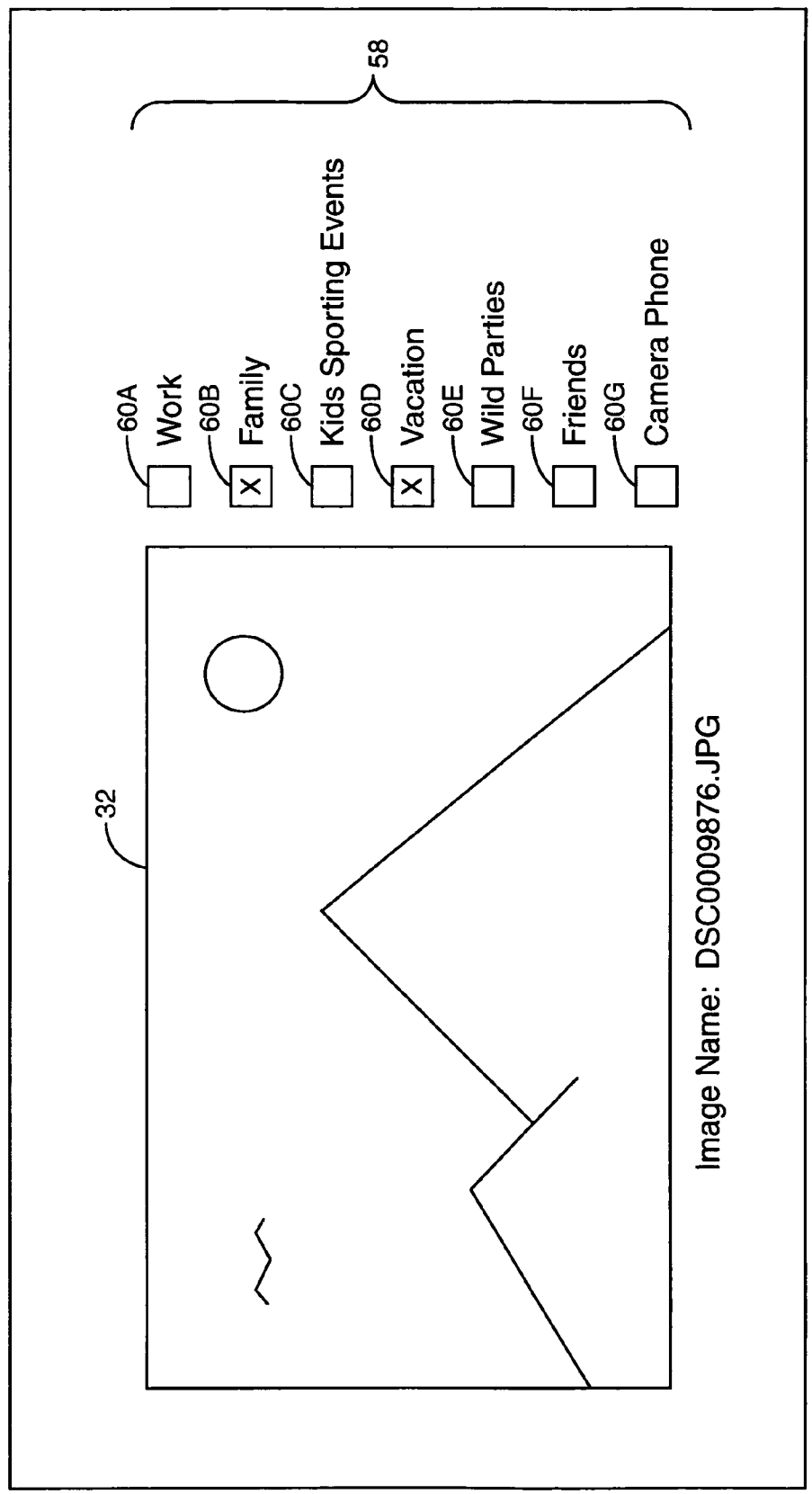
FIG. 3 illustrates an exemplary user interface for tagging digital images with one or more keywords on a per image basis.

The digital images 32-46 may be tagged with keywords on a per album basis or on a per image basis. FIG. 3 illustrates an exemplary user interface for tagging the digital images 32-46 on a per image, or per asset, basis. More specifically, FIG. 3 illustrates a user interface for tagging the digital image 32 with one or more keywords. In this example, the digital image 32 is displayed to the user 18A along with a list 58 of the keywords. The keywords are associated with check boxes 60A-60G. The user 18A selects which of the keywords are to be associated with the digital image 32 by, for example, checking the check boxes 60A-60G next to the desired keywords. In this example, the keywords "family" and "vacation" are selected by checking check boxes 60B and 60D. Thereafter, the digital image 32 is associated with the selected keywords by, for example, storing the selected keywords in metadata associated with the digital image 32 or in an application file associated with the peer software 24.

Figure 4:
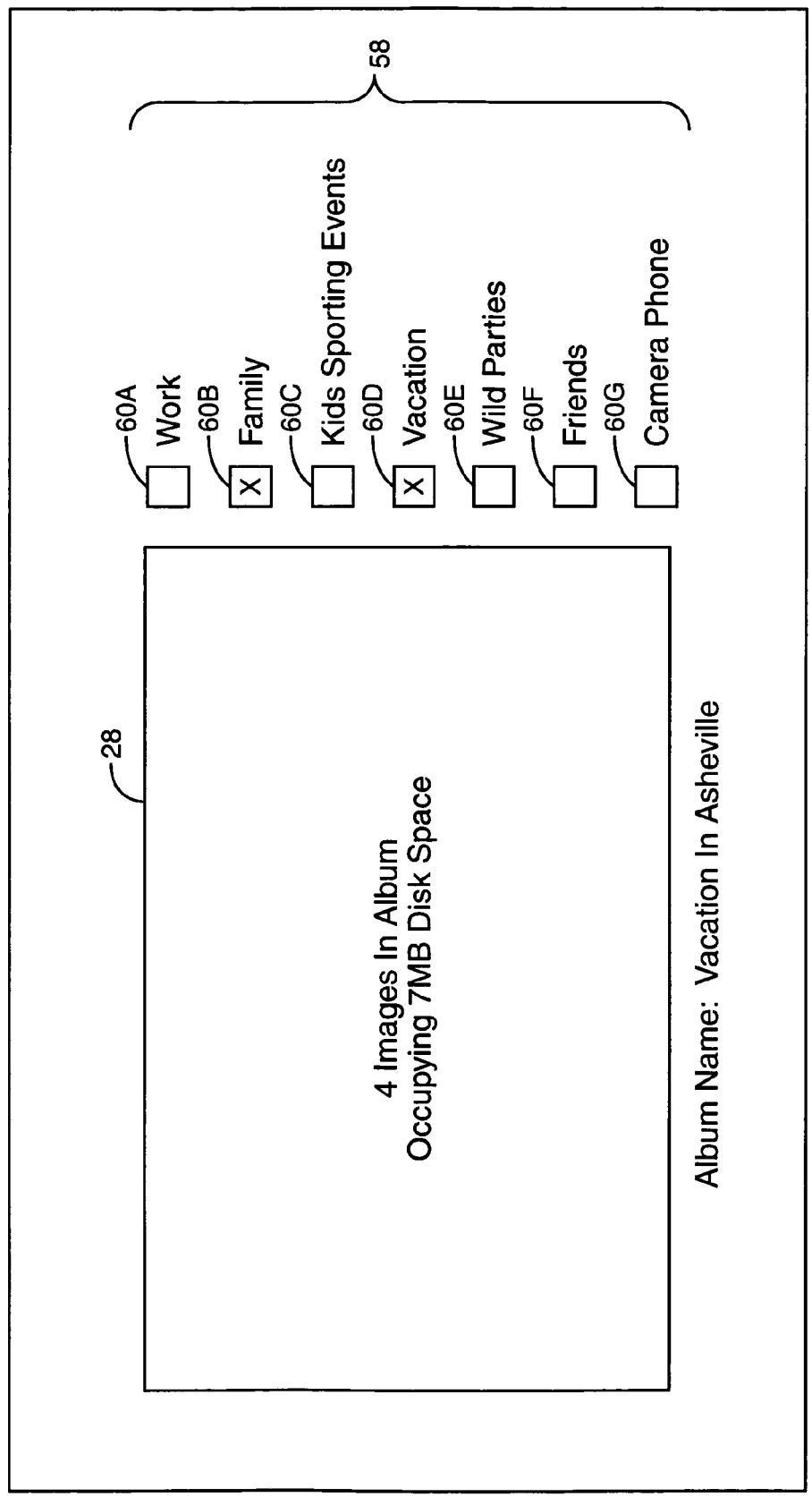
FIG. 4 illustrates an exemplary user interface for tagging each digital image in a photo album with one or more keywords on a per album basis.

FIG. 4 illustrates an exemplary user interface for tagging the digital images 32-46 with one or more keywords on a per album basis. More specifically, FIG. 4 illustrates tagging the digital images 32-38 within the photo album 28 with one or more keywords. As illustrated, the name of the photo album 28 is "Vacation in Asheville." The list 58 of the keywords is displayed to the user 18A, and the user 18A selects which of the keywords are to be associated with the digital images 32-38 of the photo album 28 by, for example, checking the check boxes 60A-60G next to the desired keywords. In this example, check boxes 60B and 60D associated with the keywords "family" and "vacation" are checked, thereby selecting these keywords. Thereafter, the photo album 28, and more specifically the digital images 32-38 within the photo album 28, is associated with the selected keywords by, for example, storing the selected keywords in metadata associated with the digital images 32-38 or in an application file associated with the peer software 24.

Returning to FIG. 2, after the digital images 32-46 are tagged with one or more keywords, the peer node 12A publishes, or sends, the list of keywords to the photosharing server 14 (step 102). Note that the list of keywords may alternatively be sent to the photosharing server 14 after the list of keywords is first defined by the user 18A and before the digital images 32-46 are tagged with one or more of the keywords. Upon receiving the keywords, the photosharing server 14 stores the keywords in association with the peer node 12A.

The user 18A then identifies potential guests and the peer node sends a list of the potential guests to the photosharing server 14 (step 104). The potential guests may be users associated with other peer nodes such as the peer node 12B or users associated with guest nodes such as the guest node 16. In the preferred embodiment, the user 18A identifies the potential guests by providing an e-mail address for each of the potential guests to the peer node 12A. The peer node 12A then provides the e-mail addresses of the potential guests to the photosharing server 14 and instructs the photosharing server 14 to send an invitation to the potential guests via e-mail.

In response, the photosharing server 14, and more specifically the upload management software 53, provides an invitation including the list of the keywords to each of the potential guests via e-mail (step 106). Optionally, the invitation may additionally solicit the potential guests for new keywords that the potential guests feel would be beneficial in the categorization of the digital images 32-46. The invitation is displayed to the potential guest via e-mail software or a web browser. The potential guests then select the keywords in which they are interested and responses are sent to the photosharing server 14 (step 108). For example, if one of the potential guests is the user 20 associated with the guest node 16, the invitation is sent to the e-mail address of the user 20 and displayed to the user 20 via the e-mail software 55 or the web browser 56. The user 20 then selects one or more of the keywords in which the user 20 is interested, and the guest node 16 sends a response to the photosharing server 14 identifying the keywords selected by the user 20.

An exemplary e-mail invitation is illustrated in FIG. 5. As illustrated, the invitation includes a list 58 of the keywords used to tag the digital images 32-46 residing at the peer node 12A and requests that the potential guest selects one or more of the keywords in which he or she is interested. The list 58 may also include information such as the number of digital images tagged with each of the keywords and the like.

The potential guest selects one or more of the keywords by checking one or more check boxes 62A-62G associated with the desired keywords. In this example, the keywords "kids sporting events" and "camera phone" are selected by checking check boxes 62C and 62G. In one embodiment, the invitation is provided as Hypertext Mark-up Language (HTML) form. Thus, after selecting the desired keywords by checking the corresponding ones of the check boxes 62A-62G, the potential guest may submit a response by, for example, clicking on a "submit" button (not shown). The response, which may be a Hypertext Transfer Protocol (HTTP) request, is provided to the photosharing server 14 and identifies the keywords selected by the potential guest.

FIG. 5 also illustrates that the invitation may allow the potential guest to select "Match All Categories" or "Match Any Category." If the potential guest selects "Match All Categories," then the potential guest is interested in digital images that are tagged with all of the keywords. If the potential guest selects "Match Any Category," then the potential guest is interested only in digital images that are tagged with the selected keywords.

Returning to FIG. 2, upon receiving responses identifying the keywords selected by the potential guests, the photosharing server 14, and more specifically the upload management software 53, processes the responses and sends a request for images associated with the selected keywords to the peer node 12A (step 110). Since not all potential guests may respond, if responses from each of the potential guests are not received within a predetermined period of time after the invitations are sent, then the upload management software 53 assumes that all of the potential guests who desire to respond have responded and proceeds to process the responses.

In one embodiment, the upload management software 53 processes the responses identifying the keywords selected by the potential guests to generate a list of desired keywords including the keywords selected by the potential guests. The list of keywords may be prioritized based on keyword statistics such as the number of potential guests that selected each keyword and past viewing statistics for each keyword. For example, the keyword selected by ten potential guests may be given a higher priority than a keyword selected by five potential guests. As another example, keywords associated with images viewed frequently in the past may be assigned a higher priority than keywords associated with images viewed less frequently in the past. The list of keywords may alternatively or additionally be prioritized based on priorities given to each of the potential guests by the user 18A, which may also be referred to as the asset owner, and priorities assigned to the potential guests based on their past viewing statistics. For example, the keywords selected by a potential guest who has been assigned a high priority either by the user 18A or by the photosharing server 14 based on past viewing statistics may be given a high priority.

After generating the list of desired keywords and optionally prioritizing the list of desired keywords, the upload management software 53 sends a request to the peer node 12A for the digital images tagged with one or more keywords from the list of desired keywords. In the case where the list of keywords is prioritized, the digital images are uploaded to the photosharing server 14 based on the prioritized list of keywords. As such, digital images tagged with the higher priority keywords are uploaded to the photosharing server 14 and stored in the proxy cache 50 before digital images tagged with lower priority keywords are uploaded to the photosharing server 14 and stored in the proxy cache 50. Alternatively, the upload management software 53 may send separate requests for each keyword in the list of desired keywords. Thus, if the list of desired keywords is prioritized, the upload management software 53 may request the digital images tagged with the higher priority keywords before requesting the digital images tagged with the lower priority keywords.

In response to receiving the request from the upload management software 53, the peer node 12A identifies the ones of the digital images 32-46 that are tagged with the selected keywords and uploads these digital images to the photosharing server 14 (step 112). The peer node 12A may optionally store multiple versions of each of the digital images 32-46. Each of the versions may have a different resolution. For example, the peer node 12A may store a full resolution version, a screen resolution or medium resolution version, and a thumbnail or low resolution version for each of the digital images 32-46. Thus, in one embodiment, the user 18A may prioritize each of the resolutions. For example, the user 18A may give the thumbnail versions a higher priority than the full resolution and screen resolution versions. As such, when the peer node 12A receives a request to upload the digital images tagged with a particular keyword, the peer node 12A may first upload the thumbnail version of each of the images, then upload the medium resolution version of each of the images, and lastly upload the full resolution version of each of the images. In another embodiment, the peer node 12A may upload only the full resolution version. If the thumbnail resolution versions or screen resolution versions are needed, the photosharing server 14 may generate them from the full resolution version or request them from the peer node 12A.

Upon receiving the digital images from the peer node 12A, the photosharing server 14, and more specifically the upload management software 53, stores the digital images in the proxy cache 50 and notifies the potential guests that the digital images are available (step 114). Notifications may be sent in numerous manners. Preferably, a notification is sent to each of the potential guests as soon as the digital images tagged with the keywords selected by that particular potential guest are uploaded to the photosharing server 14 and stored in the proxy cache 50. As a result, each potential guest may begin viewing the digital images as soon as they are available. Alternatively, the upload management software 53 may send out notifications to the potential guests after the digital images associated with the keywords selected by all of the potential guests are uploaded and stored. Further, the notifications may include web hyperlinks to albums, images tagged with a selected keywords, or to each individual image.

FIG. 6 illustrates an exemplary notification sent to a potential guest. In this example, the notification is sent after all of the digital images associated with the keywords selected by this potential guest have been uploaded to the photosharing server 14 and stored in the proxy cache 50. The notification includes web hyperlinks 64 and 66. In this example, hyperlink 64 is a hyperlink to the digital images tagged with the keyword "Kids Sporting Events," and the hyperlink 66 is a hyperlink to the digital images tagged with the keyword "Camera Phone." Upon clicking on the hyperlink 64 or 66, an HTTP request is generated and provided to the photosharing server 14. In response to receiving the HTTP request, the photosharing server 14 generates an HTTP response including the desired digital images and sends the HTTP response to the requesting node.

Figure 7:
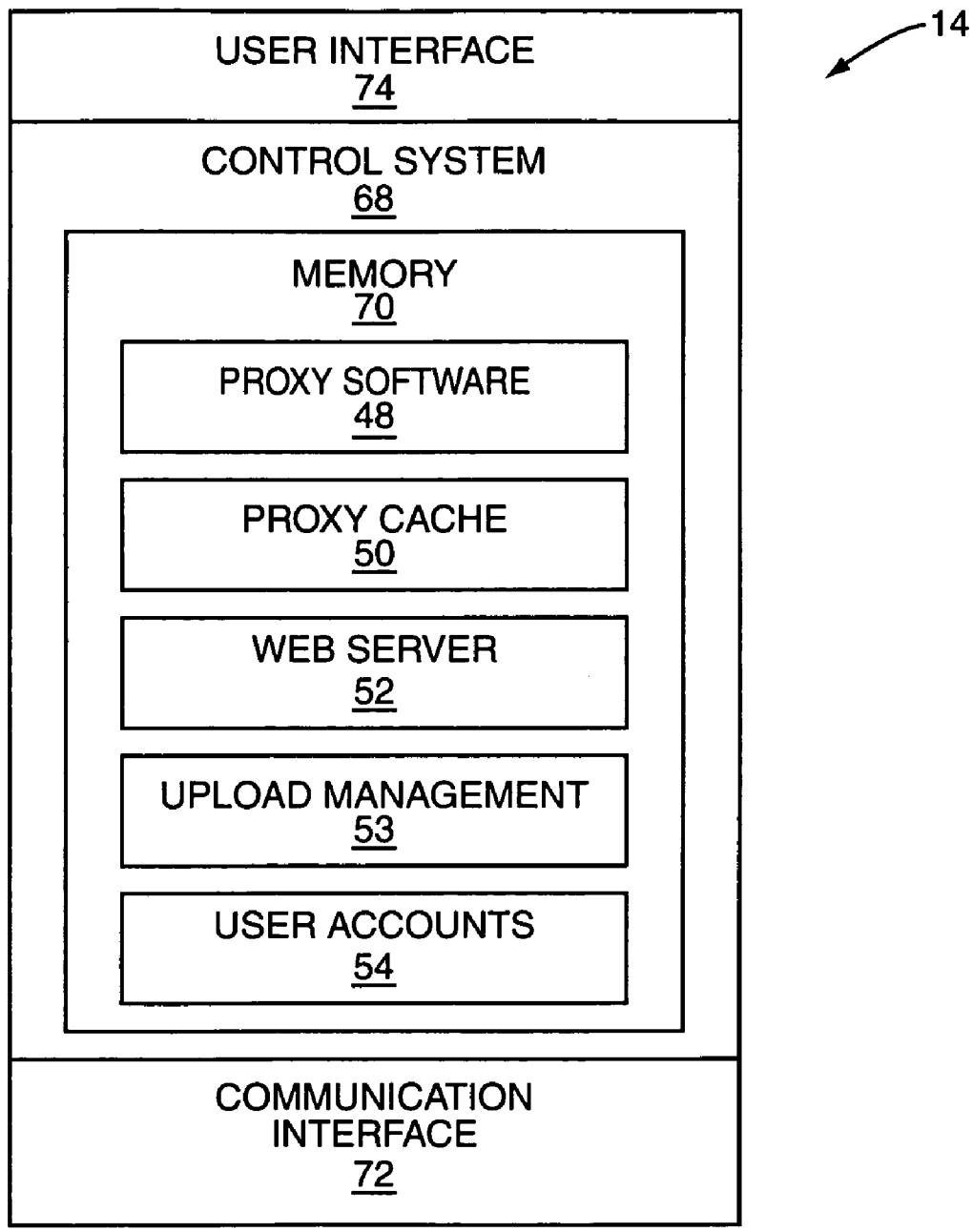
FIG. 7 is a basic block diagram of the photosharing server, or central node, of FIG. 1 according to one embodiment of the present invention.

FIG. 7 illustrates a basic block diagram of an exemplary embodiment of the proxy sever 14. The photosharing server 14 may generally include a control system 68 having associated memory 70. The memory 70 may store the proxy, software 48, the proxy cache 50, the web server 52, which may be implemented in software, the upload management software 53, and the user accounts 54. Note that the proxy cache 50 is illustrated as being part of the memory 70. However, the proxy cache 50 may be memory separate from the memory 70 of the proxy sever 14. The proxy sever 14 may also include a communication interface 72 for communicating with other network entities via the network 22. The communication interface 72 may also include an interface to various external devices. A user interface 74 may also be provided and include a keypad, a mouse, a display, and the like (not shown).

Figure 8:
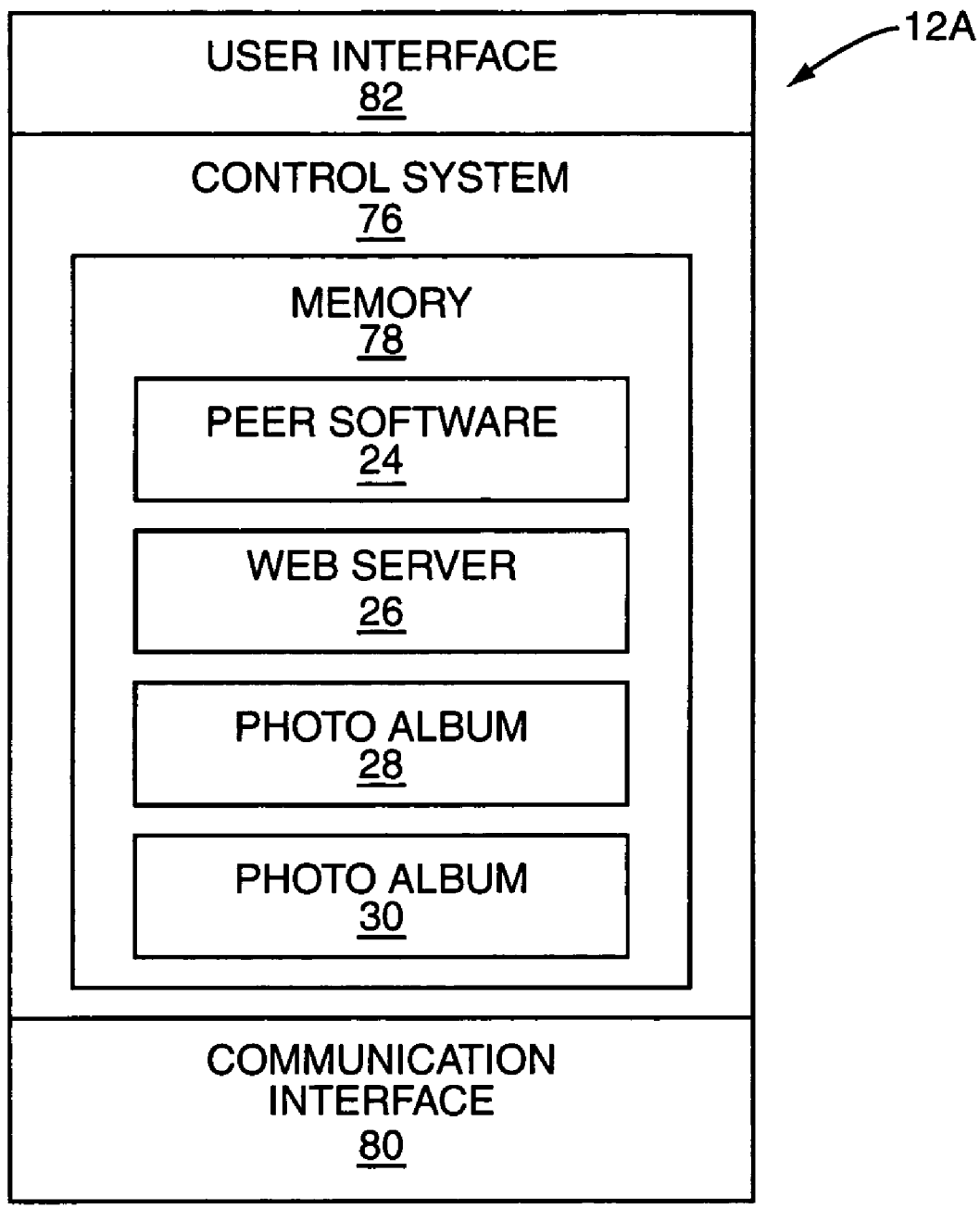
FIG. 8 is a basic block diagram of the peer node, or client node, of FIG. 1 according to one embodiment of the present invention.

FIG. 8 illustrates a basic block diagram of an exemplary embodiment of the peer node 12A. The peer node 12A may generally include a control system 76 having associated memory 78. The memory 78 may store the peer software 24, the web server 26, and the photo albums 28 and 30. The peer node 12A may also include a communication interface 80 for communicating with other network entities via the network 22. The communication interface 80 may also include an interface to various external devices such as a printer. A user interface 82 may also be provided and include a keypad, a mouse, a display, and the like (not shown).

The present invention provides substantial opportunity for variation without departing from the spirit or scope of the present invention. For example, while the present invention is described above with respect to the hybrid P2P system 10 (FIG. 1), the present invention is equally applicable to a centrally hosted sharing system. As another example, while the above description discloses that the invitations are sent to the potential guests from the photosharing server 14, the peer software 24 may operate to send the invitations directly to the potential guests. However, in either case, the responses from the potential guests may be sent to the photosharing server 14.

Further, while the description above focuses on using the e-mail addresses for the potential guests for sending invitations and notifications, other means for electronically communicating with the potential guests such as, but not limited to, instant messaging, short messaging services, text messaging, and the like will be apparent to one of ordinary skill in the art.

Those skilled in the art will recognize improvements and modifications to the preferred embodiments of the present invention. All such improvements and modifications are considered within the scope of the concepts disclosed herein and the claims that follow.

What is claimed is:

1. A central node for a digital asset sharing system comprising:
    a) a communication interface coupled to a network; and
    b) a control system associated with the communication interface and adapted to:
        i) receive a list of keywords from a client node, wherein the list of keywords comprises a plurality of keywords and each of a plurality of digital assets residing at the client node are tagged with at least one of the plurality of keywords;
        ii) receive a request from the client node to send invitations to a plurality of potential guests;
        iii) send an invitation including the list of keywords to each of the plurality of potential guests, wherein one or more of the plurality of potential guests selects at least one desired keyword from the list of keywords;
        iv) receive responses identifying the at least one desired keyword selected by the one or more of the plurality of potential guests;
        v) process the responses to form a list of desired keywords including the at least one desired keyword selected by the one or more of the plurality of potential guests; and
        i) request ones of the plurality of digital assets tagged with at least one keyword from the list of desired keywords from the client node.

2. The central node of claim 1 wherein the control system is further adapted to prioritize the list of desired keywords such that ones of the plurality of digital assets tagged with a keyword from the list of desired keywords having a highest priority are provided to the central node from the client node before ones of the plurality of digital assets tagged with a keyword from the list of desired keywords having a lowest priority.

3. The central node of claim 2 wherein the control system is further adapted to prioritize the list of desired keywords based on a number of the plurality of potential guests who selected each keyword in the list of desired keywords.

4. The central node of claim 2 wherein the control system is further adapted to prioritize the list of desired keywords based on priorities assigned to each of the plurality of potential guests by an owner of the plurality of digital assets.

5. The central node of claim 2 wherein the control system is further adapted to prioritize the list of desired keywords based on priorities assigned to each of the potential guests by the central node based on past viewing activity.

6. The central node of claim 2 wherein the control system is further adapted to prioritize the list of desired keywords based on past viewing statistics for each keyword in the list of desired keywords.

7. The central node of claim 1 wherein the control system is further adapted to:
    receive the ones of the plurality of digital assets from the client node; and
    store the ones of the plurality of digital assets.

8. The central node of claim 7 wherein the control system is further adapted to:
    receive a request from a requesting node for at least one of the ones of the plurality of digital assets stored at the central node; and
    provide the at least one of the ones of the plurality of digital assets from the central node to the requesting node.

9. The central node of claim 7 wherein the client node is further adapted to:
    store at least two versions of each of the plurality of digital assets;
    assign a priority to each of the at least two versions; and
    for each of the ones of the plurality of digital assets, provide a first one of the at least two versions having a higher priority to the central node before providing a second one of the at least two versions having a lower priority to the central node.

10. The central node of claim 7 wherein, for each of the one or more of the plurality of potential guests, the control system is further adapted to send a notification to the potential guest when the ones of the plurality of digital assets tagged with the at least one desired keyword selected by the potential guest are stored at the central node.

11. The central node of claim 10 wherein the notification includes a web hyperlink for each of the at least one desired keyword selected by the potential guest.

12. The central node of claim 1 wherein the invitation includes a Hypertext Mark-up Language (HTML) form comprising the list of keywords and means for selecting the at least one desired keyword from the list of keywords.

13. The central node of claim 1 wherein the invitation further solicits new keywords from the plurality of potential guests.

14. The central node of claim 1 wherein each of the plurality of digital assets residing at the client node are tagged with the at least one of the plurality of keywords on a per asset basis.

15. The central node of claim 1 wherein the plurality of digital assets residing at the client node are grouped into at least one album and each of the plurality of digital assets residing at the client node are tagged with the at least one of the plurality of keywords on a per album basis.

16. A method for optimizing uploading of digital assets from a client node to a central node in a digital asset sharing system comprising:
    tagging each of a plurality of digital assets residing at a client node with at least one of a plurality of keywords;
    sending an invitation including the plurality of keywords to each of a plurality of potential guests, wherein one or more of the plurality of potential guests selects at least one desired keyword from the plurality of keywords;
    providing responses to a central node identifying the at least one desired keyword selected by the one or more of the plurality of potential guests;
    processing the responses at the central node to form a list of desired keywords including the at least one desired keyword selected by the one or more of the plurality of potential guests; and
    requesting that ones of the plurality of digital assets tagged with at least one keyword from the list of desired keywords be provided from the client node to the central node.

17. The method of claim 16 wherein processing the responses further comprises prioritizing the list of desired keywords such that ones of the plurality of digital assets tagged with a keyword from the list of desired keywords having a highest priority are provided to the central node from the client node before ones of the plurality of digital assets tagged with a keyword from the list of desired keywords having a lowest priority.

18. The method of claim 17 wherein prioritizing the list of desired keywords comprises prioritizing the list of desired keywords based on a number of the plurality of potential guests who selected each keyword in the list of desired keywords.

19. The method of claim 17 wherein prioritizing the list of desired keywords comprises prioritizing the list of desired keywords based on priorities assigned to each of the plurality of potential guests by an owner of the plurality of digital assets.

20. The method of claim 17 wherein prioritizing the list of desired keywords comprises prioritizing the list of desired keywords based on priorities assigned to each of the plurality of potential guests by the central node based on past viewing activity.

21. The method of claim 17 wherein prioritizing the list of desired keywords comprises prioritizing the list of desired keywords based on past viewing statistics for each keyword in the list of desired keywords.

22. The method of claim 16 further comprising:
receiving the ones of the plurality of digital assets at the central node from the client node; and
storing the ones of the plurality of digital assets at the central node.

23. The method of claim 22 further comprising:
receiving a request at the central node from a requesting node for at least one of the ones of the plurality of digital assets stored at the central node; and
providing the at least one of the ones of the plurality of digital assets from the central node to the requesting node.

24. The method of claim 22 further comprising:
storing at least two versions of each of the plurality of digital assets at the client node;
assigning a priority to each of the at least two versions; and
for each of the ones of the plurality of digital assets, providing a first one of the at least two versions having a higher priority to the central node before providing a second one of the at least two versions having a lower priority to the central node.

25. The method of claim 22 further comprising, for each of the one or more of the plurality of potential guests, sending a notification to the potential guest when the ones of the plurality of digital assets tagged with the at least one desired keyword selected by the potential guest are stored at the central node.

26. The method of claim 25 wherein the notification includes a web hyperlink for each of the at least one desired keyword selected by the potential guest.

27. The method of claim 16 wherein tagging each of the plurality of digital assets comprises tagging each of the plurality of digital assets with the at least one of the plurality of keywords on a per asset basis.

28. The method of claim 16 wherein the plurality of digital assets residing at the client node are grouped into at least one album and tagging each of the plurality of digital assets comprises tagging each of the plurality of digital assets with the at least one of the plurality of keywords on a per album basis.

29. A method of operating a central node for a digital asset sharing system comprising:
receiving, by the central node, a list of keywords from a client node, wherein the list of keywords comprises a plurality of keywords and each of a plurality of digital assets residing at the client node are tagged with at least one of the plurality of keywords;
receiving, by the central node, a request from the client node to send invitations to a plurality of potential guests;
sending, by the central node, an invitation including the list of keywords to each of the plurality of potential guests, wherein one or more of the plurality of potential guests selects at least one desired keyword from the list of keywords;
receiving, by the central node, responses identifying the at least one desired keyword selected by the one or more of the plurality of potential guests;
processing the responses, by the central node, to form a list of desired keywords including the at least one desired keyword selected by the one or more of the potential guests; and
requesting, by the central node, ones of the plurality of digital assets tagged with at least one keyword from the list of desired keywords from the client node.

30. The method of claim 29 further comprising:
receiving, by the central node, the ones of the plurality of digital assets from the client node; and
storing, by the central node, the ones of the plurality of digital assets.

31. The method of claim 30 further comprising:
receiving, by the central node, a request from a requesting node for at least one of the ones of the plurality of digital assets stored at the central node; and
providing, by the central node, the at least one of the ones of the plurality of digital assets from the central node to the requesting node.

* * * * *